(12) United States Patent
Kim et al.

(10) Patent No.: US 10,693,148 B2
(45) Date of Patent: Jun. 23, 2020

(54) CATHODE, METAL-AIR BATTERY INCLUDING THE CATHODE, AND METHOD OF PREPARING THE CATHODE

(71) Applicant: Samsung Electronics Co., Ltd., Suwon-si, Gyeonggi-do (KR)

(72) Inventors: Hyunjin Kim, Suwon-si (KR); Hyunpyo Lee, Seoul (KR); Mokwon Kim, Suwon-si (KR); Dongmin Im, Seoul (KR)

(73) Assignee: SAMSUNG ELECTRONICS CO., LTD., Gyeonggi-Do (KR)

( * ) Notice: Subject to any disclaimer, the term of this patent is extended or adjusted under 35 U.S.C. 154(b) by 0 days.

(21) Appl. No.: 15/149,333

(22) Filed: May 9, 2016

(65) Prior Publication Data
US 2016/0372807 A1  Dec. 22, 2016

(30) Foreign Application Priority Data

Jun. 17, 2015 (KR) ........................ 10-2015-0086177

(51) Int. Cl.
| | | |
|---|---|---|
| *H01M 4/92* | (2006.01) | |
| *H01M 4/86* | (2006.01) | |
| *H01M 4/90* | (2006.01) | |
| *H01M 12/08* | (2006.01) | |

(52) U.S. Cl.
CPC ......... *H01M 4/926* (2013.01); *H01M 4/8605* (2013.01); *H01M 4/9083* (2013.01); *H01M 12/08* (2013.01); *Y02E 60/128* (2013.01)

(58) Field of Classification Search
None
See application file for complete search history.

(56) References Cited

U.S. PATENT DOCUMENTS

| | | | |
|---|---|---|---|
| 8,269,197 B2 | 9/2012 | Boer et al. | |
| 8,563,168 B2 | 10/2013 | Balsara et al. | |
| 9,356,297 B1* | 5/2016 | Atanassov | H01M 4/88 |
| 2009/0136808 A1* | 5/2009 | Kang | B01J 21/18 |
| | | | 429/532 |
| 2011/0082024 A1* | 4/2011 | Liu | A61K 9/51 |
| | | | 502/5 |
| 2011/0206994 A1 | 8/2011 | Balsara et al. | |
| 2012/0023715 A1 | 2/2012 | Nakajima | |
| 2012/0107683 A1* | 5/2012 | Kim | H01M 4/0404 |
| | | | 429/211 |
| 2012/0115049 A1 | 5/2012 | Rinzler et al. | |

(Continued)

FOREIGN PATENT DOCUMENTS

| | | |
|---|---|---|
| EP | 2495803 A1 | 9/2012 |
| KR | 1020120023715 A1 | 3/2012 |

OTHER PUBLICATIONS

Mahmood et al., "Unveiling Surface Redox Charge Storage of Interacting Two-Dimensional Heteronanosheets in Hierarchical Architectures", Nano Letters, Apr. 8, 2015;15(4): 2269-77.

*Primary Examiner* — Carmen V Lyles-Irving
(74) *Attorney, Agent, or Firm* — Cantor Colburn LLP

(57) ABSTRACT

A cathode includes: a porous carbon structure including a carbon nanostructure, wherein the porous carbon structure includes small-diameter pores having an average diameter of about 25 nanometers to about 200 nanometers, and large-diameter pores having an average diameter of greater than 200 nanometers to about 1.6 micrometers.

17 Claims, 8 Drawing Sheets

(56) References Cited

U.S. PATENT DOCUMENTS

| | | | |
|---|---|---|---|
| 2012/0234695 A1* | 9/2012 | Mayes | C01B 31/02 |
| | | | 205/758 |
| 2012/0237838 A1 | 9/2012 | Uesaka | |
| 2012/0282484 A1* | 11/2012 | Joo | D01D 5/0069 |
| | | | 428/606 |
| 2013/0183511 A1* | 7/2013 | Dai | B82Y 30/00 |
| | | | 428/220 |
| 2014/0205917 A1 | 7/2014 | Mizuno | |
| 2014/0255799 A1* | 9/2014 | Anandan | H01M 4/861 |
| | | | 429/405 |
| 2014/0308594 A1 | 10/2014 | Dodney et al. | |
| 2015/0024292 A1* | 1/2015 | Yamada | H01M 12/08 |
| | | | 429/405 |

* cited by examiner

Prior Art

Prior Art

US 10,693,148 B2

CATHODE, METAL-AIR BATTERY INCLUDING THE CATHODE, AND METHOD OF PREPARING THE CATHODE

CROSS-REFERENCE TO RELATED APPLICATION

This application claims priority to and the benefit of Korean Patent Application No. 10-2015-0086177, filed on Jun. 17, 2015, in the Korean Intellectual Property Office, and all the benefits accruing therefrom under 35 U.S.C. § 119, the content of which is incorporated herein in its entirety by reference.

BACKGROUND

1. Field

The present disclosure relates to a cathode, a metal-air battery including the cathode, and a method of preparing the cathode.

2. Description of the Related Art

A metal-air battery includes an anode that may allow deposition/dissolution of alkali metal ions, a cathode for oxidizing/reducing oxygen in the air, and a lithium-ion conducting medium disposed between the cathode and the anode.

The metal-air battery may use lithium itself as the anode and may have a high capacity because the metal-air battery does not need to store air which is used as a cathode active material. The metal-air battery may have a theoretical energy density per unit weight of about 3500 Watt-hours per kilogram (Wh/kg) or greater, which is about ten times greater than that of a lithium ion battery.

Additional improvements to further increase the capacity of metal-air batteries are needed.

SUMMARY

Provided is a cathode that includes a carbon nanostructure having both large-diameter pores and small-diameter pores.

Provided is a metal-air battery including the cathode.

Provided is a method of preparing the cathode.

Additional aspects will be set forth in part in the description which follows and, in part, will be apparent from the description, or may be learned by practice of the presented exemplary embodiments.

According to an aspect, a cathode includes a porous carbon structure including a carbon nanostructure, wherein the porous carbon structure includes small-diameter pores having an average diameter of about 25 nanometers to about 200 nm, and large-diameter pores having an average diameter of greater than 200 nanometers to about 1.6 micrometers.

According to an aspect, a metal-air battery includes: a cathode including a porous carbon structure including a carbon nanostructure, wherein the porous carbon structure includes small-diameter pores having an average diameter of about 25 nanometers to about 200 nanometers and large-diameter pores having an average diameter of greater than 200 nanometers to about 1.6 micrometers; an anode; and an electrolyte layer disposed between the cathode and the anode.

According to another aspect, a method of preparing a cathode includes: contacting a large-diameter pore-forming particle, a small-diameter pore-forming particle, a carbon nanostructure, and a solvent to form a mixture; filtering the mixture to obtain a filtrate; and removing the large-diameter pore-forming particle and the small-diameter pore-forming particle from the filtrate to prepare the cathode.

BRIEF DESCRIPTION OF THE DRAWINGS

These and/or other aspects will become apparent and more readily appreciated from the following description of the exemplary embodiments, taken in conjunction with the accompanying drawings in which:

FIGS. 5C, 5D, 5E, and 5F so the results of energy dispersive X-ray analysis (EDAX) image of the Pd catalyst-supported porous carbon structure prepared in accordance with Example 4, in which FIG. 5C is a backscattered image, FIG. 5D is a carbon map, FIG. 5E is a nitrogen map, and FIG. 5F is a palladium map;

DETAILED DESCRIPTION

Figure 1:
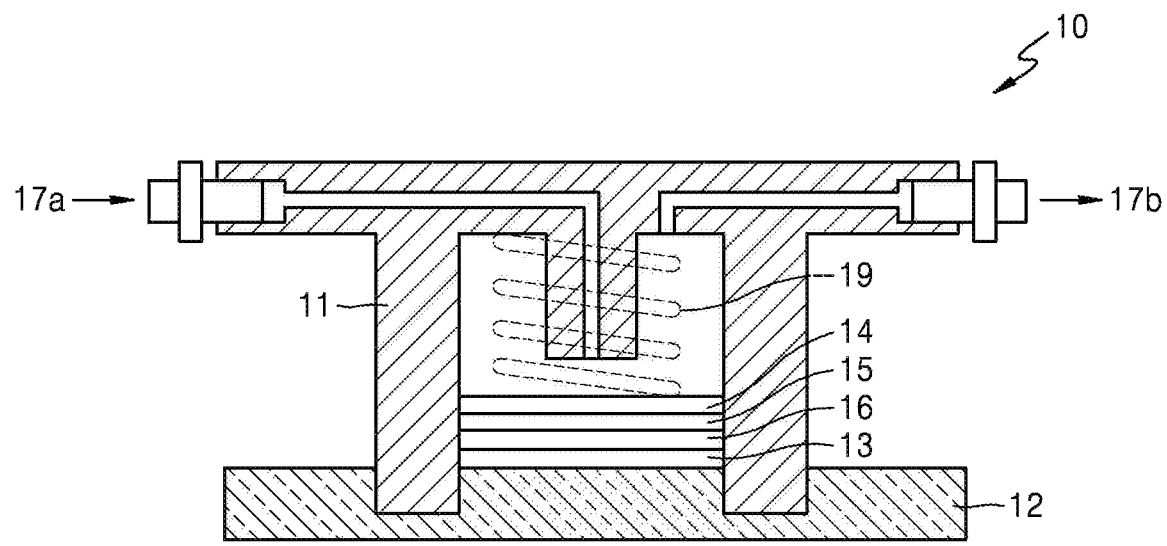
FIG. 1 is a schematic view illustrating a structure of a lithium-air battery according to an embodiment.

Reference will now be made in detail to exemplary embodiments of a cathode, a metal-air battery including the cathode, and a method of preparing the cathode, examples of which are illustrated in the accompanying drawings, wherein like reference numerals refer to like elements throughout. In this regard, the present exemplary embodiments may have different forms and should not be construed as being limited to the descriptions set forth herein. Accordingly, the exemplary embodiments are merely described below, by referring to the figures, to explain aspects.

It will be understood that when an element is referred to as being "on" another element, it can be directly on the other element or intervening elements may be present therebetween. In contrast, when an element is referred to as being "directly on" another element, there are no intervening elements present.

It will be understood that, although the terms "first," "second," "third" etc. may be used herein to describe various elements, components, regions, layers, and/or sections, these elements, components, regions, layers, and/or sections should not be limited by these terms. These terms are only used to distinguish one element, component, region, layer, or section from another element, component, region, layer, or section. Thus, "a first element," "component," "region," "layer," or "section" discussed below could be termed a second element, component, region, layer, or section without departing from the teachings herein.

The terminology used herein is for the purpose of describing particular embodiments only and is not intended to be limiting. As used herein, the singular forms "a," "an," and "the" are intended to include the plural forms, including "at least one," unless the content clearly indicates otherwise. "At least one" is not to be construed as limiting "a" or "an." "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom" and "upper" or "top," may be used herein to describe one element's relationship to another element as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The exemplary term "lower," can therefore, encompasses both an orientation of "lower" and "upper," depending on the particular orientation of the figure. Similarly, if the device in one of the figures is turned over, elements described as "below" or "beneath" other elements would then be oriented "above" the other elements. The exemplary terms "below" or "beneath" can, therefore, encompass both an orientation of above and below.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10%, or 5% of the stated value.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

The cathode of a metal-air battery may be prepared by mixing a carbonaceous material, a binder, and the like. However, the use of the binder may lower the capacity of the cathode, and the binder may decompose during charging and discharging and thus deteriorate the cathode. The discharge products produced in the cathode during discharging may clog pores in the cathode.

According to an aspect, there is provided a cathode having a porous carbon structure including a carbon nanostructure, wherein the porous carbon structure includes small-diameter pores having an average diameter of about 25 nanometers (nm) to about 200 nm and large-diameter pores having an average diameter of larger than 200 nm to about 1.6 micrometers (μm). The porous carbon structure may consist essentially of, or alternatively, may consist of a carbon nanostructure.

Due to the inclusion of both of the large-diameter pores and the small-diameter pores, the cathode may effectively accommodate volume changes, which, while not wanting to be bound by theory, are understood to be caused by discharge products produced during the charging and discharging of a metal-air battery, and the clogging of pores in the cathode may also be suppressed. Accordingly, a metal-air battery including the cathode may have improved discharge capacity and cycle characteristics. Due to the presence of the carbon nanostructure, an additional component such as a binder may be omitted, and thus decomposition of the binder which may occur during charging and discharging of the metal-air battery, may be suppressed. Accordingly, a metal-air battery including the cathode may have improved lifetime characteristics and energy density.

For example, an average diameter of the small-diameter pores may be in a range of about 25 nm to about 200 nm, or in a range of about 30 nm to about 180 nm, and in some embodiments, about 40 nm to about 180 nm, and in some other embodiments, about 50 nm to about 150 nm. When the average diameter of the small-diameter pores is within these ranges, the porous carbon structure may effectively accommodate volumetric changes caused by discharge products. When the average diameter of the small-diameter pores is excessively small (e.g., less than about 25 nm), the effect may be substantially the same as if no small-diameter pores are present. When the average diameter of the small-diameter pores is excessively large (e.g., greater than about 200 nm), the porous carbon structure may effectively have a reduced porosity due to a reduced difference in diameter between the small-diameter pores and the large-diameter pores.

For example, an average diameter of the large-diameter pores may be in a range of about 200 nm to about 1.6 µm, or in a range of about 250 nm to about 1.5 µm, and in some embodiments, about 280 nm to about 1.0 µm, and in some other embodiments, about 300 nm to about 750 nm, and in some other embodiments, about 300 nm to 500 nm. When the average diameter of the large-diameter pores is within these ranges, the porous carbon structure of the cathode may have improved mechanical characteristics. When the average diameter of the large-diameter pores is excessively small (e.g., less than about 200 nm), the porous carbon structure of the cathode may have a reduced porosity due to a reduced difference in diameter between the small-diameter pores and the large-diameter pores. When the average diameter of the large-diameter pores is excessively large (e.g., greater than about 1.6 µm), the porous carbon structure may be more likely to be brittle.

In some embodiments, the average diameter of the small-diameter pores in the cathode may be about one-tenth (1/10) to about one half (1/2) of the average diameter of the large-diameter pores. When the ratio of the average diameter of the small-diameter pores to the large-diameter pores is within this range (e.g., about 1:10 to about 1:2), the porous carbon structure of the cathode may have improved porosity and mechanical characteristics. When the average diameter of the small-diameter pores is less than 1/10 of the average diameter of the large-diameter pores, the average diameter of the small-diameter pores is excessively small, and the effect may be substantially the same as when no small-diameter pores are formed. When the average diameter of the small-diameter pores is greater than 1/2 of the average diameter of the large-diameter pores, a difference in average diameter between the small-diameter pores and the large-diameter pores is excessively small, and there may be essentially no effect which results by forming differently sized pores. Accordingly, the porous carbon structure of the cathode may have reduced porosity.

Since the cathode includes the small-diameter pores in addition to the large-diameter pores, the porous carbon structure of the cathode may have improved porosity. Consequently, gas diffusion into the porous carbon structure may be improved thereby generating additional space to accommodate discharge products such as $Li_2O_2$. For example, the porous carbon structure of the cathode may have a porosity of about 40% to about 70%, and in some embodiments, about 45% to about 65%, and in some other embodiments, about 50% to about 60%. Due to the further inclusion of the small-diameter pores among the large-diameter pores in the porous carbon structure, the porous carbon structure may have improved porosity. For example, the large-diameter pores may be responsible for about 30% to about 50% of the porosity of the porous carbon structure, while the small-diameter pores may be responsible for about 10% to about 20% of the porosity of the porous carbon structure. When the porosity of the porous carbon structure is excessively low, a metal-air battery including the cathode may have reduced charge and discharge characteristics. When the porosity of the porous carbon structure is too high, the porous carbon structure may be more likely to brittle.

The large-diameter pores and the small-diameter pores of the cathode may be homogeneously distributed in the porous carbon structure of the cathode. In other words, the large-diameter pores or small-diameter pores may not be concentrated in a particular region of the porous carbon structure. Further, the large-diameter pores or small-diameter pores may not have a gradient in concentration in a particular region of the cathode. The concentration of the large-diameter pores or small-diameter pores is defined as the number of large-diameter pores and/or small-diameter pores in a unit volume.

The porous carbon structure of the cathode may have a disordered porous structure. The large-diameter pores and small-diameter pores may be irregularly distributed in the porous carbon structure. The large-diameter pores and small-diameter pores of the porous carbon structure may not have an ordered pore structure or a periodic pore structure.

The porous carbon structure of the cathode may include a three-dimensional (3D) channel in which a plurality of pores is interconnected. The 3D channel may facilitate diffusion of external air into the metal-air battery. The 3D channel may have a disordered structure due to the disordered arrangement of the plurality of pores therein. The porous carbon structure of the cathode may include carbon nanostructures that are interconnected with each other to form a disordered 3D framework in which the large-diameter pores and/or small-diameter pores are interconnected to form the 3D channel.

The "carbon nanostructure" constituting the porous carbon structure in the cathode refers to a structure with at least one dimension in nanoscale. The term "nanoscale" as used herein refers to at least one dimension (e.g., a diameter, width, or a length) has a size of less than 1000 nm, e.g., less than 100 nm. The carbon nanostructure refers to a structure having a particular shape, but is not considered a nanoparticle. In other words, carbonaceous particles in nanoscale are not considered a carbon nanostructure. For example, carbon nanoparticles may not be considered to form a carbon nanostructure.

The carbon nanostructure of the cathode may be at least one selected from a one-dimensional (1D) carbon nanostructure and a two-dimensional (2D) carbon nanostructure. The term "1D carbon nanostructure" used herein refers to a carbon nanostructure having one dimension significantly larger than the other two dimensions, e.g., a carbon nanostructure in which the length in one dimension is significantly greater than the combined lengths of the other dimensions. For example, the 1D carbon nanostructure may be at least one selected from a carbon nanotube, a carbon nanowire, a carbon nanofiber, a carbon nanobelt, and a carbon nanorod, but is not limited thereto. The 1D carbon nanostructure may be any suitable 1D carbon nanostructure, including those available in the art. For example, the carbon nanotube may include a single-walled carbon nanotube (SWCNT) and/or a multi-walled carbon nanotube (MWCNT), but is not limited thereto. Any suitable carbon nanotube available in the art may be used as the 1D carbon nanostructure.

The term "2D carbon nanostructure" used herein refers to a carbon nanostructure with two dimensions significantly larger than the other one dimension, e.g., a carbon nanostructure in which the combined area defined by two dimensions is significantly larger than a thickness. For example, the 2D carbon nanostructure may be at least one selected from graphene oxide, reduced graphene oxide, a graphene nanoplate, and a carbon nanosheet, but is not limited thereto. The 2D carbon nanostructure may be any suitable 2D carbon nanostructure known in the art.

The porous carbon structure of the cathode may be a free-standing film. The porous carbon structure may form a self-supporting film that wherein a separate support substrate may be omitted if desired. Thus, the porous carbon structure may be used for various uses regardless of the type of support substrate.

The porous carbon structure of the cathode may have a small bulk density. For example, while a porous cathode including a carbonaceous material and a binder has a loading mass of about 1 milligram per square centimeter (mg/cm$^2$) or greater at a thickness of about 35 μm, the porous carbon structure of the cathode according to an embodiment may have a loading mass of about 0.5 mg/cm$^2$ or less. For example, the porous carbon structure of the cathode may have a loading mass of about 0.4 mg/cm$^2$ or less, and in some embodiments, about 0.3 mg/cm$^2$ or less, and in some other embodiments, about 0.2 mg/cm$^2$ or less. Thus, the porous carbon structure of the cathode may provide improved porosity per unit volume of the cathode.

The porous carbon structure may have improved flexibility. For example, the porous carbon structure may have a tensile modulus of about 0.001 gigapascals to about 1 gigapascal. Accordingly, the porous carbon structure as a free-standing film may be flexibly bent and may not be brittle. The porous carbon structure as a free-standing film may have sufficient elasticity to return to its original shape. Thus, the porous carbon structure may be applicable to various types of batteries, and may also readily absorb stress caused by discharge products generated during charging and discharging of a battery.

The porous carbon structure of the cathode may have a low surface resistance. For example, the porous carbon structure may have a surface resistance of about 100 ohms per square centimeter (Ω/cm$^2$) or less at a thickness of about 35 μm, and in some embodiments, about 50 Ω/cm$^2$ or less, and in some other embodiments, about 10 Ω/cm$^2$ or less, and in some other embodiments, about 5 Ω/cm$^2$ or less. Accordingly, the porous carbon structure may provide improved conductivity.

Due to the inclusion of the small-diameter pores in addition to the large-diameter pores, the relative number of large-diameter pores to the total number of pores is reduced. As a result, the porous carbon structure of the cathode may have improved mechanical strength as compared to a porous carbon structure including only large-diameter pores. Accordingly, the porous carbon structure of the cathode may have increased tensile strength. For example, the porous carbon structure of the cathode according to any of the above-described embodiments may have a tensile strength of about 1 megapascal (MPa) or greater, and in some embodiments, about 2 MPa or greater, and in some other embodiments, about 3 MPa or greater, and in some other embodiments, about 3.2 MPa or greater. Thus, the porous carbon structure of the cathode may provide improved mechanical characteristics.

In some embodiments, the large-diameter pores and small-diameter pores in the cathode may each independently have a shape of at least one selected from a sphere, an oval, a polyhedron, and a rod, but is not limited thereto. The large-diameter pores and small-diameter pores may be each independently have any suitable shape available in the art. For example, the large-diameter pores and small-diameter pores may each have a sphere shape.

The carbon nanostructure in the cathode may comprise a plurality of carbon nanostructures which form a shape of at least a partially opened hollow sphere, but is not limited thereto. The plurality of carbon nanostructure may have any suitable shape available in the art. For example, the plurality of carbon nanostructures may form a hemisphere shape. In other words, the porous carbon structure of the cathode may be formed by aggregating and overlapping a plurality of at least partially opened hollow spheres. A single, at least partially opened, hollow sphere may form a single pore. For example, the partially opened hollow sphere may be formed by connecting a plurality of interconnected 2D carbon nanostructures such as reduced graphene oxide. In other words, a plurality of 2D nanostructures can be aggregated to form a partially opened hollow sphere.

In some embodiments, the plurality of carbon nanostructures in the cathode may form a hollow sphere shape at least partially constituted by a plurality of 1D carbon nanostructures. The porous carbon structure of the cathode may be formed by a plurality of overlapping and/or aggregating at least partially opened hollow spheres. A single at least partially opened hollow sphere may form a single pore. For example, the partially opened hollow sphere may be formed by connecting a plurality of 1D carbon nanostructures. In other words, a plurality of 1D nanostructures can be aggregated to form a partially opened hollow sphere.

The cathode according to an embodiment may further include a metal catalyst supported on the porous carbon structure. The metal catalyst may be at least one selected from Pt, Pd, Au, Ag, Ru, Os, Rh, Mn, V, Fe, Ir, Co, Cu, and Ni, but is not limited thereto. Any suitable metal catalyst available in the art may be used.

The metal catalyst may include a metal nanoparticle. The metal catalyst may be supported by the porous carbon structure, for example, on an interior or exterior wall of the large-diameter pores and/or small-diameter pores.

The metal catalyst may have a particle diameter of about 10 nm to about 500 nm. For example, the metal catalyst may have a particle diameter of about 20 nm to about 250 nm, and in some embodiments, about 50 nm to about 150 nm. However, the metal catalyst is not limited thereto. The particle diameter of the metal catalyst may also be appropriately selected to be within these ranges.

The amount of the metal catalyst may be in a range of about 3 parts by weight to about 30 parts by weight based on 100 parts by weight of the carbon nanostructure, but is not limited thereto. The amount of the metal catalyst may be appropriately selected.

According to another aspect, a metal-air battery includes a cathode according to an embodiment, an anode, and an electrolyte layer disposed between the cathode and the anode.

The metal of the metal-air battery may be an alkali metal. For example, the alkali metal may be lithium, sodium, or potassium. For example, the alkali metal may be lithium.

For example, a reaction mechanism of a lithium-air battery may be represented by Reaction Scheme 1.

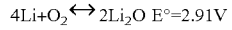

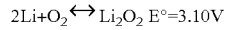     Reaction Scheme 1

During discharge, lithium originating from an anode of the lithium-air battery reacts with oxygen introduced from the cathode to generate a lithium oxide (Li$_2$O$_2$), while the oxygen is reduced (oxygen reduction reaction: ORR). On the other hand, during charge, the lithium oxide is reduced to evolve oxygen therefrom (oxygen evolution reaction: OER). During discharge, Li$_2$O$_2$ is deposited within pores of the cathode. The larger the oxygen contact area of the electrolyte, the higher the capacity of the lithium-air battery.

The electrolyte layer disposed between the cathode and the anode may include at least one electrolyte selected from a liquid electrolyte, a gel electrolyte, and a solid electrolyte. The liquid electrolyte, gel electrolyte, and solid electrolyte that may be disposed between the cathode and the anode are not particularly limited, and may be any suitable electrolyte available in the art.

For example, the liquid electrolyte may include a solvent and a lithium salt.

The solvent of the liquid electrolyte may include at least one selected from an organic solvent, an ionic liquid, and an oligomer. However, embodiments are not limited thereto. For example, the solvent may be any suitable liquid available as a solvent that is in liquid form at room temperature (25° C.).

The organic solvent may include at least one selected from an ether-based solvent, a carbonate-based solvent, an ester-based solvent, and a ketone-based solvent.

For example, the organic solvent may include at least one selected from propylene carbonate, ethylene carbonate, fluoroethylene carbonate, vinyl ethylene carbonate butylene carbonate, dimethyl carbonate, diethyl carbonate, methyl ethyl carbonate, methyl propyl carbonate, ethyl propyl carbonate, methyl isopropyl carbonate, dipropyl carbonate, dibutyl carbonate, benzonitrile, acetonitrile, tetrahydrofuran, 2-methyltetrahydrofuran, γ-butyrolactone, dioxolane, 4-methyldioxolane, dimethylacetamide, dimethyl sulfoxide, dioxane, 1,2-dimethoxyethane, sulfolane, dichloroethane, chlorobenzene, nitrobenzene, succinonitrile, diethylene glycol dimethyl ether (DEGDME), tetraethylene glycol dimethyl ether (TEGDME), polyethylene glycol dimethyl ether (PEGDME, number average molecular weight (Mn=about 500), dimethyl ether, diethyl ether, dibutyl ether, dimethoxyethane, 2-methyltetrahydrofuran, and tetrahydrofuran, but is not limited thereto. The organic solvent may be any organic solvent available in the art that is in liquid form at room temperature.

For example, the ionic liquid may be represented by Formula a or Formula b.

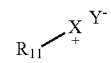

Formula b

In Formula b, X may be —N($R_2$)($R_3$)($R_4$) or —P($R_2$)($R_3$)($R_4$); $R_2$ and $R_3$ may each independently be an unsubstituted or substituted C1-C30 alkyl group, an unsubstituted or substituted C1-C30 alkoxy group, an unsubstituted or substituted C6-C30 aryl group, an unsubstituted or substituted C6-C30 aryloxy group, an unsubstituted or substituted C3-C30 heteroaryl group, an unsubstituted or substituted C3-C30 heteroaryloxy group, an unsubstituted or substituted C4-C30 cycloalkyl group, an unsubstituted or substituted C3-C30 heterocycloalkyl group, or an unsubstituted or substituted C2-C100 alkylene oxide group. $R_{11}$ may be an unsubstituted or substituted C1-C30 alkyl group, an unsubstituted or substituted C1-C30 alkoxy group, an unsubstituted or substituted C6-C30 aryl group, an unsubstituted or substituted C6-C30 aryloxy group, an unsubstituted or substituted C3-C30 heteroaryl group, an unsubstituted or substituted C3-C30 heteroaryloxy group, an unsubstituted or substituted C4-C30 cycloalkyl group, an unsubstituted or substituted C3-C30 heterocycloalkyl group, or an unsubstituted or substituted C2-C100 alkylene oxide group; and $Y^-$ may be an anion. For example, the $Y^-$ may be at least one selected from $BF_4^-$, $PF_6^-$, $AsF_6^-$, $SbF_6^-$, $AlCl_4^-$, $HSO_4^-$, $ClO_4^-$, $CH_3SO_3^-$, $CF_3CO_2^-$, $(CF_3SO_2)_2N^-$, $Cl^-$, $Br^-$, $I^-$, $BF_4^-$, $SO_4^-$, $PF_6^-$, $ClO_4^-$, $CF_3SO_3^-$, $CF_3CO_2^-$, $(C_2F_5SO_2)_2N^-$, $(C_2F_6SO_2)(CF_3SO_2)N^-$, and $(CF_3SO_2)_2N^-$.

For example,

in Formula a may be represented by one of Formulae c, and

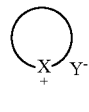

Formula a

In Formula a, represents a 3- to 31-membered group comprising 2 to 30 carbon atoms which may be saturated, or unsaturated, or aromatic, and optionally at least one heteroatom in addition to X, wherein X may be —N($R_2$)($R_3$)—, —N($R_2$)—, —P($R_2$)—, or —P($R_2$)($R_3$)— wherein $R_2$ and $R_3$ may each independently be hydrogen, a substituted or unsubstituted $C_1$-$C_{30}$ alkyl group, a substituted or unsubstituted $C_1$-$C_{30}$ alkoxy group, a substituted or unsubstituted $C_6$-$C_{30}$ aryl group, a substituted or unsubstituted $C_6$-$C_{30}$ aryloxy group, a substituted or unsubstituted $C_3$-$C_{30}$ heteroaryl group, a substituted or unsubstituted $C_3$-$C_{30}$ heteroaryloxy group, a substituted or unsubstituted $C_4$-$C_{30}$ cycloalkyl group, a substituted or unsubstituted $C_3$-$C_{30}$ heterocycloalkyl group, or a substituted or unsubstituted $C_2$-$C_{100}$ alkyleneoxide group; and $Y^-$ may be at least one selected from $BF_4^-$, $PF_6^-$, $AsF_6^-$, $SbF_6^-$, $HSO_4^-$, $ClO_4^-$, $CH_3SO_3^-$, $CF_3CO_2^-$, $(CF_3SO_2)_2N^-$, $Cl^-$, $Br^-$, $I^-$, $BF_4^-$, $SO_4^-$, $PF_6^-$, $ClO_4^-$, $CF_3SO_3^-$, $CF_3CO_2^-$, $(C_2F_5SO_2)_2N^-$, $(C_2F_5SO_2)(CF_3SO_2)N^-$, and $(CF_3SO_2)_2N^-$.

in Formula 6 may be represented by Formula d.

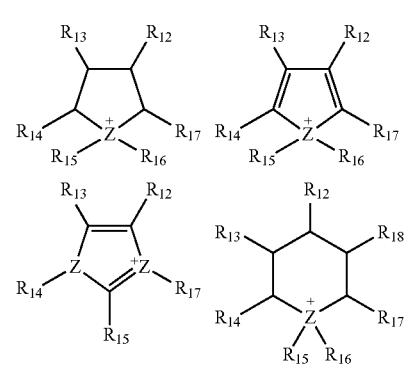

Formula c

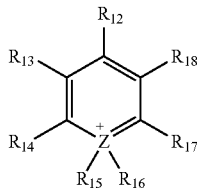

In Formulae c, Z may be N or P; and $R_{12}$ to $R_{18}$ may be each independently hydrogen, an unsubstituted or substituted C1-C30 alkyl group, an unsubstituted or substituted C1-C30 alkoxy group, an unsubstituted or substituted C6-C30 aryl group, an unsubstituted or substituted C6-C30 aryloxy group, an unsubstituted or substituted C3-C30 heteroaryl group, an unsubstituted or substituted C3-C30 heteroaryloxy group, an unsubstituted or substituted C4-C30 cycloalkyl group, an unsubstituted or substituted C3-C30 heterocycloalkyl group, or an unsubstituted or substituted C2-C100 alkylene oxide group.

Formula d

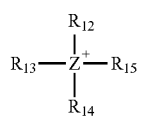

In Formula d, Z may be N or P; and $R_{12}$ to $R_{15}$ may be each independently hydrogen, an unsubstituted or substituted C1-C30 alkyl group, an unsubstituted or substituted C1-C30 alkoxy group, an unsubstituted or substituted C6-C30 aryl group, an unsubstituted or substituted C6-C30 aryloxy group, an unsubstituted or substituted C3-C30 heteroaryl group, an unsubstituted or substituted C3-C30 heteroaryloxy group, an unsubstituted or substituted C4-C30 cycloalkyl group, an unsubstituted or substituted C3-C30 heterocycloalkyl group, or an unsubstituted or substituted C2-C100 alkylene oxide group.

For example, the ionic liquid may include at least one selected from N,N-diethyl-N-methyl-N-(2-methoxyethyl) ammonium tetraborate ([DEME][BF$_4$]), diethylmethylammonium trifluoromethanesulfonate ([dema][TfO]), dimethylpropylammonium trifluoromethanesulfonate ([dmpa][TfO]), diethylmethylammonium trifluoromethanesulfonyl imide ([dema][TFSI]), and methylpropylpiperidinium trifluoromethanesulfonyl imide ([mpp][TFSI]), but is not limited thereto. The ionic liquid may be any ionic liquid available in the art that is in liquid form at room temperature.

The lithium salt of the liquid electrolyte may include at least one selected from LiTFSI, LiPF$_6$, LiBF$_4$, LiAsF$_6$, LiClO$_4$, LiNO$_3$, (lithium bis(oxalato) borate (LiBOB), LiCF$_3$SO$_3$, LiN(SO$_2$CF$_3$)$_2$, LiN(SO$_2$C$_2$F$_5$)$_2$, LiC(SO$_2$CF$_3$)$_3$, LiN(SO$_3$CF$_3$)$_2$, LiC$_4$F$_9$SO$_3$, LiAlCl$_4$, and lithium trifluoromethanesulfonate (LiTfO), but is not limited thereto. Any suitable material available as a lithium salt in the art may be used.

For example, the gel electrolyte of the electrolyte layer may include a lithium salt at a concentration of about 0.01 molar (M) to about 2.0 M. However, the concentration of the lithium salt is not limited thereto, and may be appropriately adjusted if desired. When the concentration of the lithium salt in gel electrolyte is within this range, further improved battery characteristics may be obtained.

For example, the solid electrolyte of the electrolyte layer may include at least one selected from an ionically conducting polymer, a polymeric ionic liquid (PIL), an inorganic electrolyte, a polymer matrix, and an electronically conducting polymer, but is not limited thereto. Any suitable material available as a solid electrolyte in the art may be used. The polymer matrix may not have ionic conductivity or electronic conductivity.

For example, the solid electrolyte may include at least one selected from polyethylene oxide (PEO), a solid graft copolymer including at least two polymer blocks having low glass transition temperatures (Tg), poly(diallyldimethylammonium) bis(trifluoromethanesulfonyl) imide (TFSI), Cu$_3$N, Li$_3$N, LiPON, Li$_3$PO$_4$.Li$_2$S.SiS$_2$, Li$_2$S. GeS$_2$.Ga$_2$S$_3$, Li$_2$O.11Al$_2$O$_3$, Na$_2$O.11Al$_2$O$_3$, (Na,Li)$_{1+x}$Ti$_{2-x}$Al$_x$(PO$_4$)$_3$ (wherein (0.1≤x≤0.9), Li$_{1+x}$Hf$_{2-x}$Al$_x$(PO$_4$)$_3$ (wherein 0.1≤x≤0.9), Na$_3$Zr$_2$Si$_2$PO$_{12}$, Li$_3$Zr$_2$Si$_2$PO$_{12}$, Na$_5$ZrP$_3$O$_{12}$, Na$_5$TiP$_3$O$_{12}$, Na$_3$Fe$_2$P$_3$O$_{12}$, Na$_4$NbP$_3$O$_{12}$, Na-Silicates, Li$_{0.3}$La$_{0.5}$TiO$_3$, Na$_5$MSi$_4$O$_{12}$ (wherein M is a rare earth element, for example, Nd, Gd, or Dy), Li$_5$ZrP$_3$O$_{12}$, Li$_5$TiP$_3$O$_{12}$, Li$_3$Fe$_2$P$_3$O$_{12}$, Li$_4$NbP$_3$O$_{12}$, Li$_{1+x}$(M,Al,Ga)$_x$(Ge$_{1-y}$Ti$_y$)$_{2-x}$(PO$_4$)$_3$ (wherein x≤0.8, 0≤y≤1.0, and M is Nd, Sm, Eu, Gd, Tb, Dy, Ho, Er, Tm, or Yb), Li$_{1+x+y}$Q$_x$Ti$_{2-x}$Si$_y$P$_{3-y}$O$_{12}$ (wherein 0≤x≤0.4, 0<y≤0.6, and Q is Al or Ga), Li$_6$BaLa$_2$Ta$_2$O$_{12}$, Li$_7$La$_3$Zr$_2$O$_{12}$, Li$_5$La$_3$Nb$_2$O$_{12}$, Li$_5$La$_3$M$_2$O$_{12}$ (wherein M is Nb or Ta), and Li$_{7+x}$A$_x$La$_{3-x}$Zr$_2$O$_{12}$ (wherein 0<x<3 and A is Zn).

For example, the ion conductive polymer may include at least one ion conductive repeating unit selected from an ether-based monomer, an acryl-based monomer, a methacryl-based monomer, and a siloxane-based monomer.

For example, the ion conductive polymer may be at least one selected from poly(ethylene oxide), poly(propylene oxide), poly(methyl methacrylate), poly(ethyl methacrylate), poly(dimethylsiloxane), poly(methyl acrylate), poly(ethyl acrylate), poly(2-ethylhexyl acrylate), poly(butyl methacrylate), poly(2-ethylhexyl methacrylate), poly(decyl acrylate), and poly(ethylene vinyl acetate).

For example, the ion conductive polymer may be a copolymer including an ion conductive repeating unit and a structural repeating unit.

For example, the ion conductive repeating unit may be derived from at least one monomer selected from acrylic acid, methacrylic acid, methyl acrylate, methyl methacrylate, ethyl acrylate, ethyl methacrylate, 2-ethylhexyl acrylate, butyl methacrylate, 2-ethylhexyl methyl methacrylate, decyl acrylate, ethylene vinyl acetate, ethylene oxide, and propylene oxide. For example, the structural repeating unit may be derived from at least one monomer selected from styrene, 4-bromostyrene, tert-butylstyrene, divinylbenzene, methyl methacrylate, isobutyl methacrylate, butadiene, ethylene, propylene, dimethyl siloxane, isobutylene, N-isopropyl acrylamide, vinyl fluoride, acrylonitrile, 4-methyl pentene-1, butylene terephthalate, ethylene terephthalate, and vinyl pyridine.

For example, the ion conductive polymer may be a block copolymer including an ion conductive phase and a structural phase. Examples of the block copolymer including an ion conductive phase and a structural phase include block copolymers disclosed in U.S. U.S. Pat. Nos. 8,269,197, 8,563,168, and US 2011/0206994, herein incorporated by reference in their entirety.

For example, the gel electrolyte may be obtained by adding a solvent to a solid electrolyte located between the cathode and the anode. For example, the gel electrolyte may be a gel electrolyte obtained by adding, for example, a low-molecular weight solvent to a solid electrolyte including a common polymer as a main component.

For example, a metal-air battery according to any of the above-embodiments may be a lithium-air battery.

A metal-air battery according to an embodiment may be prepared in the following manner.

First, a cathode having a porous carbon structure according to an embodiment as described above is prepared. The cathode is an air electrode. A cathode current collector may be disposed on the cathode.

A porous structure in a matrix or mesh form may be used as the cathode current collector to facilitate diffusion of oxygen. A porous metal plate made of, for example, steel use stainless (SUS), nickel, or aluminum may also be used as the cathode current collector. Materials for preparing the cathode current collector are not particularly limited, and any appropriate materials for preparing cathode current collectors may be used. The cathode current collector may be coated with an anti-oxidation metal or an alloy film to prevent oxidation.

A catalyst for facilitating oxidation/reduction of oxygen may be added to the cathode of the metal-air battery. Non-limiting examples of the catalyst include at least one selected from precious metal-based catalysts, such as platinum (Pt), gold (Au), silver (Ag), palladium (Pd), ruthenium (Ru), rhodium (Rh), and osmium (Os); oxide-based catalysts, such as manganese oxide, iron oxide, cobalt oxide, and nickel oxide; and organic metal-based catalysts, such as cobalt phthalocyanine. Any appropriate catalysts for oxidation and reduction of oxygen may be used.

The catalyst may be supported on a support. Non-limiting examples of the support include an oxide, zeolite, clay mineral, and carbon. The oxide may include at least one aluminum oxide, silicon oxide, zirconium oxide, and titanium dioxide. The oxide support may be an oxide that includes at least one metal selected from cerium (Ce), praseodymium (Pr), samarium (Sm), europium (Eu), terbium (Tb), thulium (Tm), ytterbium (Yb), antimony (Sb), bismuth (Bi), vanadium (V), chromium (Cr), manganese (Mn), iron (Fe), cobalt (Co), nickel (Ni), copper (Cu), niobium (Nb), molybdenum (Mo), and tungsten (W). Non-limiting examples of the carbon support include carbon black, such as Ketjen black, acetylene black, channel black, and lamp black; graphite, such as natural graphite, artificial graphite, and expanded graphite; activated carbon; and carbon fibers. Any appropriate materials available as supports in the art may be used.

Next, an anode is prepared.

The anode may be an alkali metal thin film, for example, a lithium metal thin film. For example, the lithium metal may be a lithium metal-based alloy, such as an alloy of lithium with, for example, aluminum, tin, magnesium, indium, calcium, titanium, or vanadium.

A separator may be disposed between the cathode and the anode. The separator may be any separator having a composition suitable for use in a lithium-air battery. For example, the separator may be a polymeric non-woven fabric such as a polypropylene non-woven fabric or a polyphenylene sulfide non-woven fabric; a porous film of an olefin-based resin such as polyethylene or polypropylene; glass fiber; or a combination thereof.

An oxygen blocking layer, i.e. layer that is impervious to oxygen, may be disposed between the cathode and the anode. The oxygen blocking layer, which may be a lithium ion conductive solid electrolyte layer, may serve as a protective layer that prevents direct reaction of the lithium metal anode with impurities such as oxygen present in an electrolyte of the cathode. An example of a material for the lithium ion conductive solid electrolyte layer that is impervious to oxygen may include an inorganic material-containing lithium ion conductive glass, lithium ion conductive crystals (ceramic or glass-ceramic), or a mixture thereof. However, any solid electrolyte layer having conductivity and being impervious to oxygen to protect the anode may be used. For example, the lithium ion conductive solid electrolyte layer may be an oxide layer in view of chemical stability.

When the lithium ion conductive solid electrolyte layer includes a large amount of lithium ion conductive crystals, the lithium ion conductive solid electrolyte layer may have high ion conductivity. Accordingly, the amount of the lithium ion conductive crystals may be, for example, about 50 weight percent (wt %) or more, about 55 wt % or more, or about 60 wt % or more, based on a total weight of the lithium ion conductive solid electrolyte layer.

Non-limiting examples of lithium ion conductive crystals are crystals having a perovskite structure with lithium ion conductivity, such as $Li_3N$, a lithium super ionic conductor (LISICON), or $La_{0.55}Li_{0.35}TiO_3$; $LiTi_2P_3O_{12}$ having a sodium super ionic conductor (NASICON) type structure; or glass-ceramic able to precipitate these crystals.

For example, the lithium ion conductive crystals may have a structure of $Li_{1+x+y}(Al, Ga)_x(Ti, Ge)_{2-x}Si_yP_{3-y}O_{12}$ (wherein $0 \leq x \leq 1$ and $0 \leq y \leq 1$ for example, $0 \leq x \leq 0.4$ and $0 < y \leq 0.6$, or $0.1 \leq x \leq 0.3$ and $0.1 < y \leq 0.4$). To increase the ion conductivity of lithium ion conductive crystals, the lithium ion conductive crystals must have no grain boundary that may interrupt ion conduction. For example, glass-ceramic materials have essentially no hole or grain boundary interrupting ion conduction, and thus may have high ion conductivity and good chemical stability.

Non-limiting examples of glass-ceramic materials for use as the lithium ion conductive crystals are include at least one selected from lithium-aluminum-germanium-phosphate (LAGP), lithium-aluminum-titanium-phosphate (LATP), and lithium-aluminum-titanium-silicon-phosphate (LATSP).

For example, when a parent glass having $Li_2O$—$Al_2O_3$—$TiO_2$—$SiO_2$—$P_2O_5$ composition is crystallized by thermal treatment, the resulting main crystal phase may be $Li_{1+x+y}Al_xTi_{2-x}Si_yP_{3-y}O_{12}$ (wherein $0 \leq x = 1$ and $0 \leq y \leq 1$). For example, in the formula $Li_{1+x+y}Al_xTi_{2-x}Si_yP_{3-y}O_{12}$, x and y may satisfy, for example, $0 \leq x \leq 0.4$ and $0 < y \leq 0.6$, or $0.1 \leq x \leq 0.3$ and $0.1 < y \leq 0.4$.

The holes or grain boundary interrupting ion conduction refers to an ion conduction-interrupting material including holes or boundaries that reduce the total conductivity of lithium ion conductive crystals to one-tenth (1/10) or less of the conductivity of the lithium ion conductive crystals alone in the inorganic material.

For example, the oxygen blocking layer may include $Li_{1+x+y}Al_xTi_{2-x}Si_yP_{3-y}O_{12}$ (wherein $0 \leq x \leq 1$ and $0 \leq y \leq 1$). In some embodiments, in the formula $Li_{1+x+y}Al_xTi_{2-x}Si_yP_{3-y}O_{12}$, x and y may satisfy that $0 \leq x \leq 0.4$ and $0 < y \leq 0.6$, for example, $0.1 \leq x \leq 0.3$ and $0.1 < y \leq 0.4$.

In some embodiments, the oxygen blocking layer may include $Li_{1+x+y}Al_x(Ti,Ge)_{2-x}Si_yP_{3-y}O_1$ (wherein $0 \leq x \leq 2$ and $0 \leq y \leq 3$). For example, the oxygen blocking layer may be a solid electrolyte membrane including LATP ($Li_{1.4}Ti_{1.6}Al_{0.4}P_3O_{12}$).

In some embodiments, the lithium-air battery may further include an anode interlayer between the anode and the oxygen blocking layer. The anode interlayer may prevent the occurrence of a side reaction that may take place between the anode and the oxygen blocking layer.

The anode interlayer may include a solid polymer electrolyte. For example, the solid polymer electrolyte may be polyethylene oxide doped with a lithium salt, wherein non-limiting examples of the lithium salt include at least one selected from $LiN(SO_2CF_2CF_3)_2$, $LiBF_4$, $LiPF_6$, $LiSbF_6$, $LiAsF_6$, $LiClO_4$, $LiCF_3SO_3$, $LiN(SO_2CF_3)_2$, $LiN(SO_2C_2F_5)_2$, $LiC(SO_2CF_3)_3$, $LiN(SO_3CF_3)_2$, $LiC_4F_9SO_3$, and $LiAlCl_4$.

A metal-air battery according to any of the above-described embodiments may be available as a primary battery or a secondary battery. The metal-air battery may have any shape, and in some embodiments, may have a shape like a coin, a button, a sheet, a stack, a cylinder, a plane, or a horn. The metal-air battery may be used as a large battery for electric vehicles.

A metal-air battery according to an exemplary embodiment is schematically illustrated in FIG. 1. Referring to FIG. 1, a lithium-air battery 10 according to an embodiment includes a cathode 15 configured to use oxygen as an active material adjacent to a first current collector (not shown), an anode 13 that includes lithium adjacent to a second current collector 12, and an electrolyte layer 16 located between the cathode 15 and the anode 12. The electrolyte layer 16 may include an electrolyte solution. An anode interlayer (not shown) may be further disposed between the anode 13 and the electrolyte layer 16. The first current collector may serve as a gas diffusion layer and is formed of a porous material that allows diffusion of oxygen. A porous carbon paper 14 as a gas diffusion layer may be further disposed between the first current collector and the cathode 15. A pressing member 19 that may transport air to the cathode 15 may be located on the first current collector. A case 11 made of an insulating resin may be disposed between the cathode 15 and the anode 13 to electrically separate the cathode 15 and the anode 13. Air may be supplied into the metal-air battery 10 through an air inlet 17a and is discharged through an air outlet 17b. The metal-air battery 10 may be accommodated in an SUS container.

The term "air" used herein is refers to atmospheric (ambient) air, and for convenience, also refers to a combination of gases including oxygen, or pure oxygen gas. This broad definition of "air" also applies to terms, such as "air battery" and "air electrode" used herein.

According to another aspect of the present disclosure, a method of preparing a cathode according to any of the above-described embodiments includes: contacting a large-diameter pore-forming particle, a small-diameter pore-forming particle, a carbon nanostructure, and a solvent to form a mixture; filtering the mixture to obtain a filtrate; and removing the large-diameter pore-forming particle and the small-diameter pore-forming particle from the filtrate to prepare the cathode.

According to the above-described method, the porous carbon structure having a carbon nanostructure and including large-diameter pores and small-diameter pores may be easily obtained.

Detailed types and shapes of the carbon nanostructure used in the above-describe method may be the same as those described above in conjunction with the embodiments of the cathode.

In some embodiments of the above-described method, the large-diameter pore-forming particle and the small-diameter pore-forming particle include at least one selected from a polymer particle, a metal oxide particle, and a solvent, but are not limited thereto. The large-diameter pore-forming particle and the small-diameter pore-forming particle may include any material that may be used as a sacrificial template, i.e., may be removed by a chemical or physical method, or a template that may be volatilized by annealing.

For example, the large-diameter pore-forming particle and the small-diameter pore-forming particle may be each independently selected from a polymer of radically polymerizable monomers, a polymer of multifunctional crosslinking monomers, a microemulsion of polymer beads, a metal oxide selected from at least one of $SiO_2$, $TiO_2$, $ZrO_2$, and $Al_2O_3$, a metal particle selected from at least one of copper (Cu), nickel (Ni), and zinc (Zn). For example, the large-diameter pore-forming particle and the small-diameter pore-forming particle may be at least one of polystyrene (PS) particles and silica ($SiO_2$) particles, or the like.

The large-diameter pore-forming particles and the small-diameter pore-forming particles may have an average particle diameter of about 25 nm to about 1.6 µm. For example, the large-diameter pore-forming particles and the small-diameter pore-forming particles may include small-diameter forming particles having an average diameter of about 25 nm to about 200 nm and large-diameter forming particles having an average diameter of larger than 200 nm to about 1.6 µm, respectively. The average diameters of the large-diameter pore-forming particles and the small-diameter pore-forming particles are not limited to these ranges. The large-diameter pore-forming particles and the small-diameter pore-forming particles may each independently have an appropriate average diameter depending on the method used to prepare the large-diameter pore-forming particles and the small-diameter pore-forming particles, and the dispersion state thereof.

The large-diameter pore-forming particles and the small-diameter pore-forming particles may further include various functional groups on their surface. The inclusion of various functional groups may improve the dispersibility of the large-diameter pore-forming particles and the small-diameter pore-forming particles in the solvent dispersion and enhance the interaction with the carbon nanostructure. For example, the functional groups on the large-diameter pore-forming particles and the small-diameter pore-forming particles may be —COOH, —NH₂, —OH, or the like, but are not limited thereto. Any suitable functional group known to improve dispersibility and enhance the interaction in the art may be used.

In some embodiments of the above-described method, the solvent may be at least one selected from water, alcohol, and ammonia water, but is not limited thereto. Any solvent known to uniformly distribute the carbon nanostructure, the large-diameter pore-forming particles, and the small-diameter pore-forming particles may be used.

In some embodiments of the above-described method, the mixture including a large-diameter pore-forming particle, a small-diameter pore-forming particle, a carbon nanostructure, and a solvent may include a combination of the large-diameter pore-forming particles and the small-diameter pore forming particles in an amount of about 100 parts by weight to about 600 parts by weight of the large-diameter pore-forming particles plus the small-diameter pore-forming particles based on 100 parts by weight of the carbon nanostructure. For example, the mixture may include about 200 parts to about 500 parts by weight of the large-diameter pore-forming particles and the small-diameter pore-forming particles, and in some embodiments, about 300 parts to about 500 parts by weight of the large-diameter pore-forming particles and the small-diameter pore-forming particles, and in some other embodiments, about 350 parts to about 450 parts by weight of the large-diameter pore-forming particles and the small-diameter pore-forming particles, based on 100 parts by weight of the carbon nanostructure. When the combined amount of the large-diameter pore-forming particles and the small-diameter pore-forming particles in the mixture is excessively low, the porous carbon structure may have reduced porosity. When the combined amount of large-diameter pore-forming particles and the small-diameter pore-forming particles in the mixture is excessively high, the porous carbon structure may have reduced mechanical strength and thus be more likely to be brittle.

In some embodiments of the above-described method, the large-diameter pore-forming particle and the small-diameter pore-forming particle may be removed using a chemical or physical method. For example, the large-diameter pore-forming particle and the small-diameter pore-forming particle may be removed using at least one process selected from thermal annealing, etching, or the like.

The thermal annealing may be performed at a temperature of about 300° C. to about 700° C. under a nitrogen atmosphere, for a time period of about 2 hours to about 4 hours. However, the conditions for the thermal annealing are not limited thereto and may be appropriately controlled.

The etching may be performed using an etchant capable of dissolving both the large-diameter pore-forming particles and the small-diameter pore-forming particles. For example, the etchant may be at least one selected from a strong acid, a strong base, and an organic solvent, but is not limited thereto. In some embodiments of the above-described method, the mixture of the large-diameter pore-forming particle, the small-diameter pore-forming particle, the carbon nanostructure, and the solvent may further include a metal catalyst. For example, the metal catalyst may include a metal nanoparticle, a metal precursor, or the like, but is not limited thereto. Any material that may serve as a metal catalyst in a porous carbon structure may be used. Available types, sizes, and amounts of the metal catalyst may be the same as those of the metal catalyst described above in conjunction with the embodiments of the cathode.

One or more embodiments of the present disclosure will now be described in detail with reference to the following examples. However, these examples are only for illustrative purposes and are not intended to limit the scope of the one or more embodiments of the present disclosure.

EXAMPLES

Preparation of Porous Carbon Structure

Example 1: Preparation of 385 nm-50 nm-CNT Porous Carbon Structure

Fifty milligrams (mg) of carbon nanotubes ("CNTs"; CM 250, available from Hanwha Chemical Corporation, Korea) and 1.39 milliliters (mL) of an 18 wt % poly(4-styrenesulfonic acid) solution as a dispersing agent-containing solution were added to 100 mL of deionized water ($H_2O$) to prepare a first solution.

Next a mixture was prepared by combining 10 mL of the first solution (5 mg of CNTs dispersed in purified water), a second solution including 10 mg of spherical large-diameter polystyrene (PS) particles having an average particle diameter of about 385 nm, and a third solution including 10 mg of spherical small-diameter polystyrene (PS) particles having an average particle diameter of about 50 nm, in a 1:2:2 ratio of CNT: large-diameter PS: small-diameter PS based on the weight of carbon nanotubes, large-diameter PS, and small-diameter PS.

Next, the resulting mixture was filtered by vacuum suction using an Anodisc membrane filer (diameter: 25 mm, pore size: 0.2 μm, available from Whatman), followed by separating a CNT/PS free-standing composite film from the membrane filter.

The separated CNT/PS free-standing composite film was subject to thermal annealing at a temperature of about 450° C. under nitrogen atmosphere for about 2 hours to prepare a porous carbon structure consisting of CNTs and including large-diameter pores having an average particle diameter of about 380 nm, and small-diameter pores having an average particle diameter of about 50 nm.

Figure 2A:
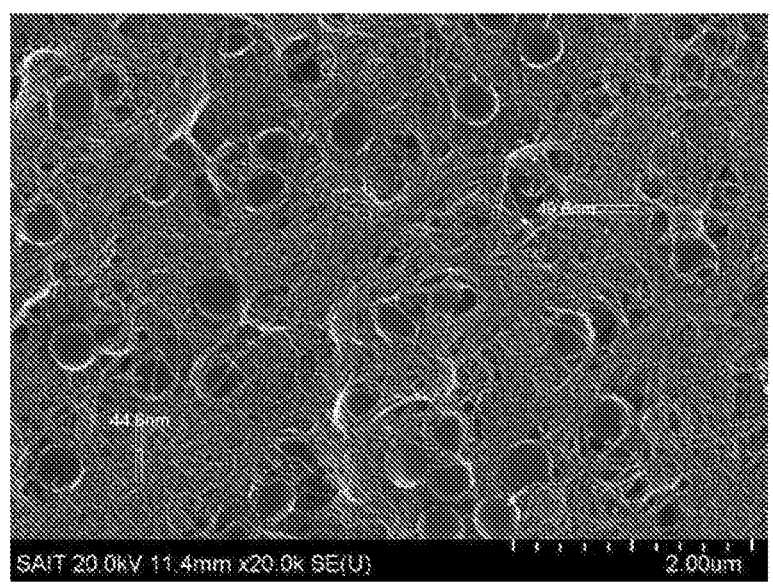
FIG. 2A is a scanning electron microscope (SEM) image of a carbon nanotube/polystyrene (CNT/PS) composite film prepared in accordance with Example 1, before the annealing.
Figure 2B:
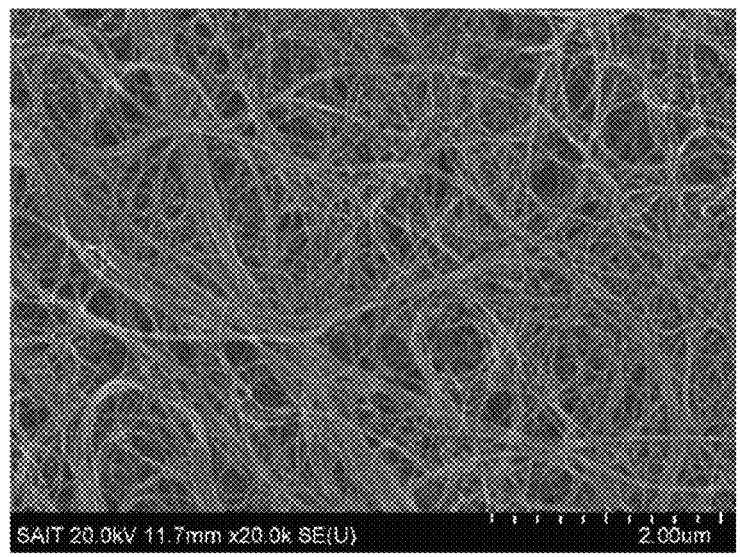
FIG. 2B is a SEM image of a porous carbon structure consisting of CNTs of prepared in accordance with Example 1, after the annealing.

FIG. 2A is a scanning electron microscopic (SEM) image of the CNT/PS free-standing composite film prior to the thermal annealing. FIG. 2B is a SEM image of the porous carbon structure using CNTs after the thermal annealing.

The porous carbon structure had a thickness of about 30 μm and a loading mass of about 0.25 mg/$cm^2$. The porous carbon structure was a free-standing film able to retain its shape without a separate support and having a flexibility satisfactory not to brittle when being bent.

Example 2: Preparation of 385 nm-120 nm-CNT Porous Carbon Structure

A porous carbon structure was prepared in the same manner as described in Example 1, except that the average diameter of the spherical small-diameter PS particles was changed from about 50 nm to about 120 nm.

Example 3: Preparation of 385 nm-120 nm-RGO Porous Carbon Structure

A porous carbon structure was prepared in the same manner as described in Example 1, except that reduced graphene oxide (RGO) was used instead of CNTs.

A dispersion solution obtained by dispersing graphene nanoplatelets (GNPs) (N002-PDR, XY dimension<10 μm, average thickness<1 nm, available from Angstron Materials) in water at a concentration of 0.5 mg/mL was used as a source of graphene oxide (GO), which was then reduced to reduced graphene oxide (RGO) through annealing.

Example 4: Preparation of 385 nm-120 nm-Pd-Catalyst-Supporting RGO Porous Carbon Structure A porous carbon structure was prepared in the same manner as described in Example 3, except that reduced graphene oxide (RGO) was used instead of CNTs, and 43 parts by weight of a Pd solution based on 100 parts by weight of graphene oxide (GO) (i.e., 1 mL of a 20 mM solution of $Na_2PdC_{14}$ (379808 Aldrich) was added as a Pd catalyst precursor (5.88 mg $Na_2PdC_{14}$, i.e., 2.13 mg of Pd), based on 5 mg of graphene oxide).

Figure 5A:
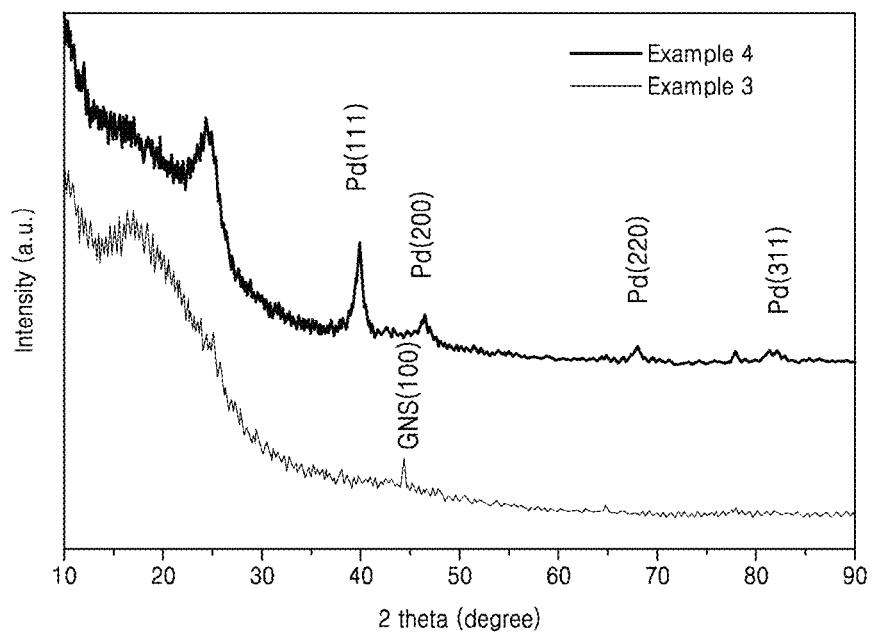
FIG. 5A is a graph of intensity (arbitrary units, a.u.) versus diffraction angle (degrees two-theta, $2\theta$) which shows the results of X-ray diffraction analysis of the porous carbon structures of Examples 3 and 4.
Figure 5B:
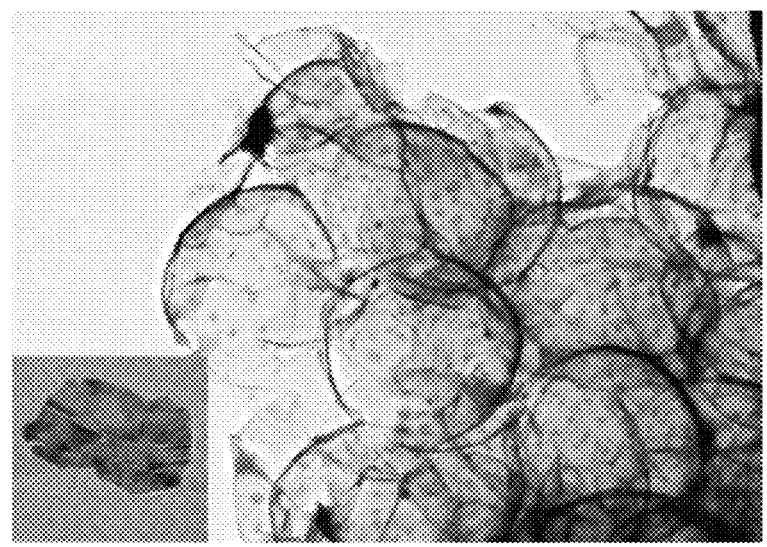
FIG. 5B is a transmission electron microscope (TEM) image of a portion of the Pd catalyst-supported porous carbon structure prepared in accordance with Example 4.
Figure 5C:
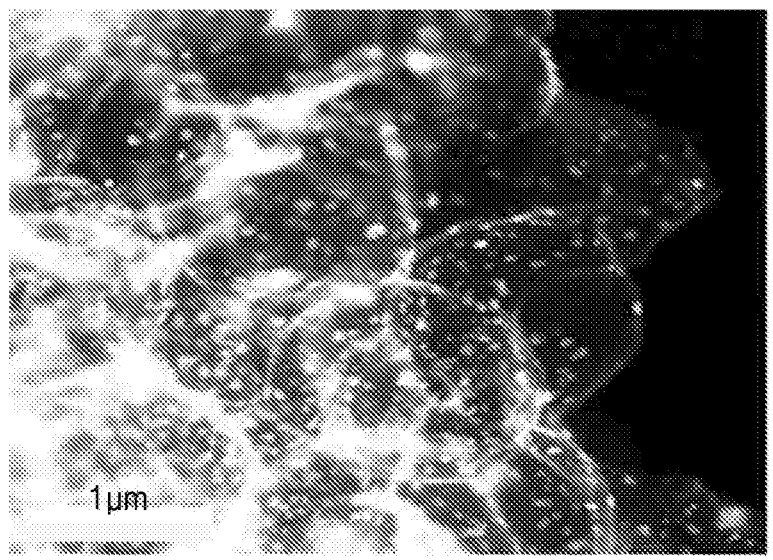
Figure 5D:
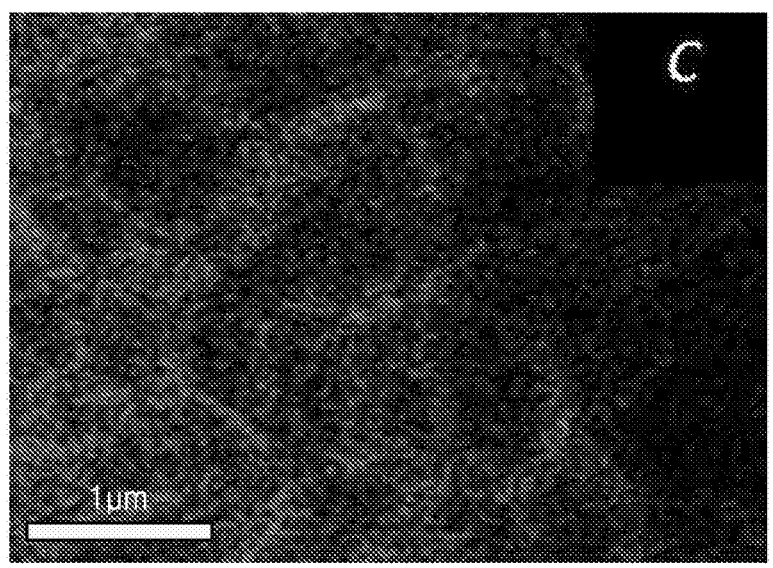
Figure 5E:
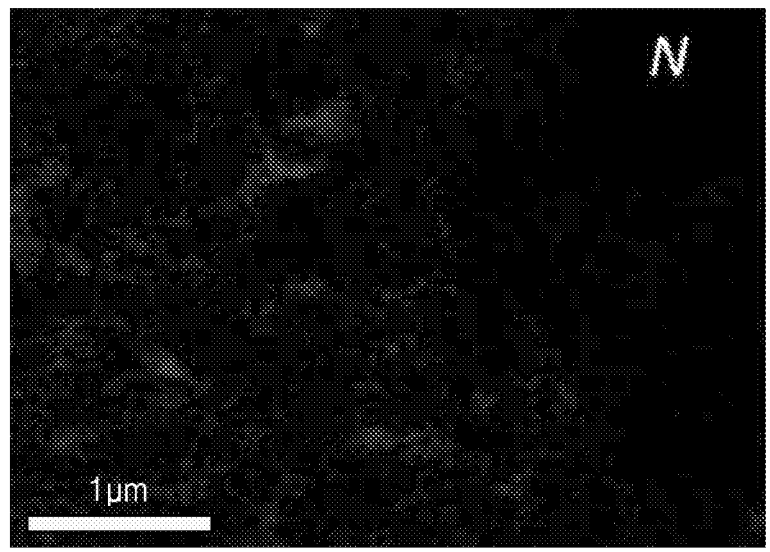
Figure 5F:
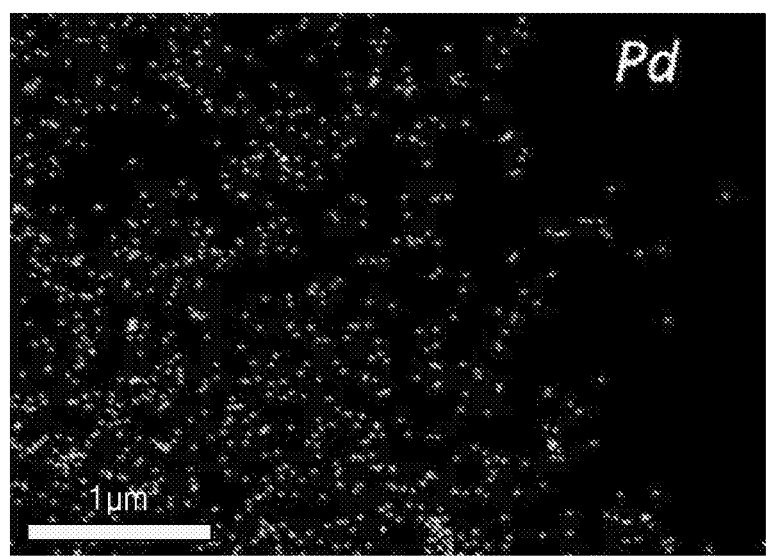

FIG. 5B is a transmission electron microscopic (TEM) image of a portion of the Pd catalyst-supporting porous carbon structure of Example 4. Referring to FIG. 5B, Pd particles were found to be supported on spherical pores. The inset image in FIG. 5B shows that the Pd particles had a diameter of about 80 nm and about 100 nm. FIG. 5C is an energy dispersive X-ray analysis (EDAX) image of the Pd-supporting porous carbon structure of Example 4.

Comparative Example 1: Preparation of 385 nm-CNT Porous Carbon Structure

A porous carbon structure was prepared in the same manner as described in Example 1, except that only spherical large-diameter PS particles having an average diameter of about 385 nm were used.

Figure 3A:
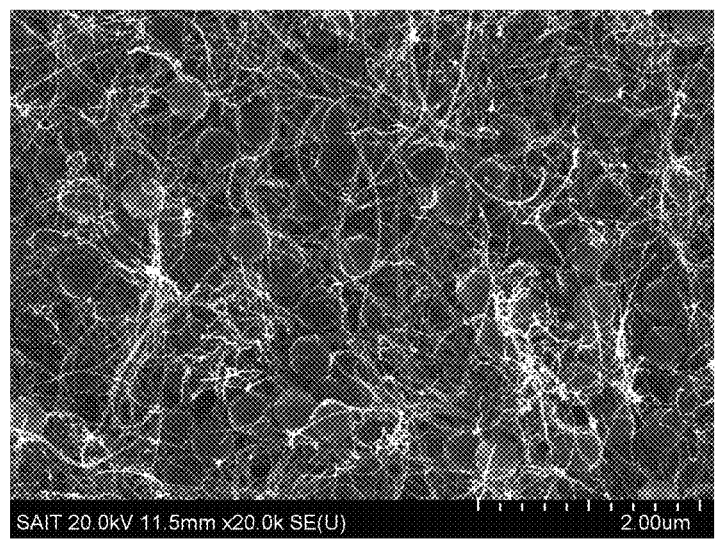
FIG. 3A is a SEM image of a CNT/PS composite film prepared in accordance with Comparative Example 1, before annealing.
Figure 3B:
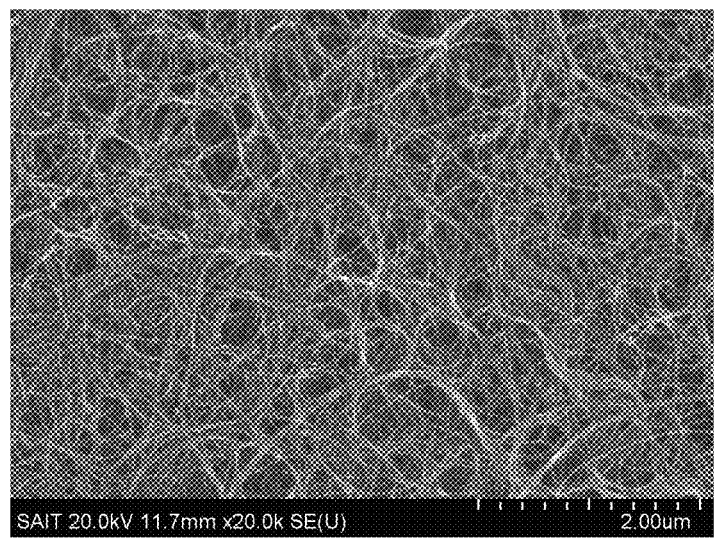
FIG. 3B is a SEM image of a porous carbon structure consisting of CNTs prepared in accordance with Comparative Example 1, after the annealing.

FIG. 3A is a SEM image of a CNT/PS free-standing composite film of Comparative Example 1 before annealing. FIG. 3B is a SEM image of the porous carbon structure of Comparative Example 1 using CNTs after the annealing.

Comparative Example 2: Preparation of 120 nm-CNT Porous Carbon Structure

A porous carbon structure was prepared in the same manner as described in Example 2, except that only spherical small-diameter PS particles having an average diameter of about 120 nm were used.

Comparative Example 3: Preparation of 840 nm-CNT Porous Carbon Structure

A porous carbon structure was prepared in the same manner as described in Example 1, except that only spherical large-diameter PS particles having an average diameter of about 840 nm were used.

Comparative Example 4: Preparation of 1.8 µm-CNT Porous Carbon Structure

A porous carbon structure was prepared in the same manner as in Example 1, except that only spherical large-diameter PS particles having an average diameter of about 1.8 µm were used.

Comparative Example 5: Preparation of CNT Porous Carbon Structure

A porous carbon structure was prepared in the same manner as in Example 1, except that no spherical PS particles were added.

Figure 4:
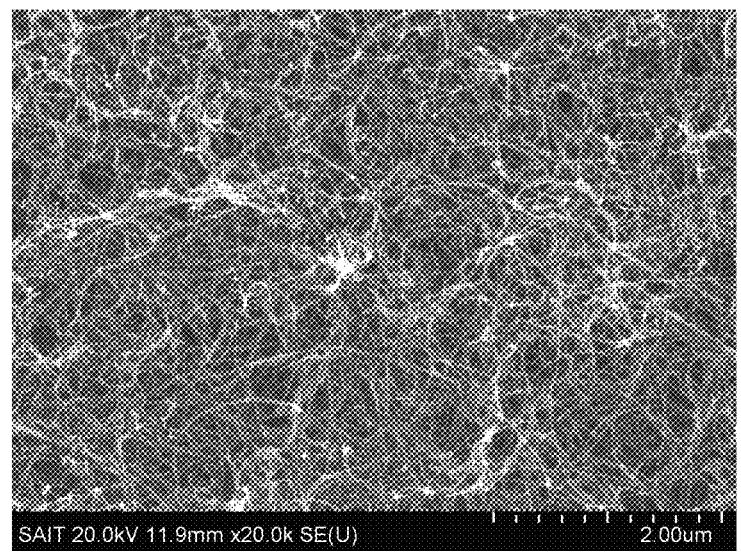
FIG. 4 is a SEM image of a porous carbon structure consisting of CNTs prepared in accordance with Comparative Example 5, after annealing.

FIG. 4 is a SEM image of the porous carbon structure of Comparative Example 5 using CNTs after annealing. (Manufacture of Lithium-Air Battery)

Example 5: Manufacture of Lithium-Air Battery

A lithium-air battery as illustrated in FIG. 1 was manufactured as follows. A lithium (Li) metal having a diameter of about 16 mm was brushed and then attached to an SUS coin cell container to prepare the anode 13 as illustrated in FIG. 1.

Glass fiber (Whatman, 1825-150 Glass Microfiber Binder Free Filter) as a separator 16 was disposed on the Li metal (anode), 0.2 mL of an electrolyte solution of 1M LiTFSI (lithium bis(trifluoromethanesulfonyl)imide and LiN$(SO_2CF_3)_2$) dissolved in tetraethylene glycol dimethyl ether (TEGDME), was injected into the separator 16.

Next, as a cathode 15, the porous carbon structure of Example 1 having a diameter of about 12 mm was disposed on the separator 16. Subsequently, a carbon paper 14 (available from SGL, 35-DA) having a diameter of about 15 mm and a thickness of 350 µm was disposed on the cathode 15, an SUS mesh (not shown) as a current collector was disposed on the carbon paper 14, and then a pressing member 19 was disposed on the current collector and pressed to fix the cell and transport air to the cathode 15, thereby manufacturing the lithium-air battery 10.

Examples 6 to 8: Manufacture of Lithium-Air Battery

Lithium-air batteries were manufactured in the same manner as described in Example 5, except that the porous carbon structures of Examples 2 to 4 were used, respectively.

Comparative Examples 6 to 10: Manufacture of Lithium-Air Battery

Lithium-air batteries were manufactured in the same manner as in Example 5, except that the porous carbon structures of Comparative Examples 1 to 5 were used, respectively.

Evaluation Example 1: X-Ray Diffraction (XRD) Evaluation

X-ray diffraction spectra of the Pd catalyst-supporting porous carbon structure of Example 4 and the porous carbon structure of Example 3 were analyzed.

Referring to FIG. 5A, a Pd peak was detected from the Pd catalyst-supporting porous carbon structure of Example 4, while no Pd peak was detected from the porous carbon structure of Example 3 including no Pd catalyst nanoparticle, indicating that Pd catalyst was supported on the porous carbon structure of Example 4

Evaluation Example 2: Porosity Evaluation

Porosities of the porous carbon structures of Examples 1 to 4 and Comparative Examples 1 to 5 were evaluated. The results are partially shown in Table 1. The porosity was calculated based on the volume of the large-diameter PS particles and/or small-diameter PS particles in each of the porous carbon structures.

TABLE 1

| Example | Porosity [%] |
| --- | --- |
| Example 2 | 50~60 |
| Comparative Example 1 | 35~45 |

Referring to Table 1, the porous carbon structure of Example 2 was found to have improved porosity as compared to the porous carbon structure of Comparative Example 1.

The improved porosity in the porous carbon structure of Example 2 is attributed to the distribution of small-diameter particles (or corresponding small-diameter pores) amongst the large-diameter particles (or corresponding large-diameter pores), compared to the porous carbon structure of Comparative Example 1 including only large-diameter particles (or corresponding pores)

Evaluation Example 3: Evaluation of Charge-Discharge Characteristics

The lithium-air batteries of Examples 5 to 8 and Comparative Examples 6 to 10 were discharged at about 60° C. under 1-atm oxygen atmosphere with a constant current of about 0.24 milliampere per square centimeter (mA/cm$^2$) to a voltage of about 1.8 V (with respect to Li), charged with the same constant current to about 4.5 V, and then subjected to charge-discharge cycles with a constant charging voltage to a charging current of about 0.02 mA/cm$^2$. The results of a charging and discharging test at the 6$^{th}$ cycle are partially shown in Table 2 and FIGS. 6A and 6B. Changes in discharge capacity with respect to number of charge-discharge cycles in the lithium-air batteries of Example 4 and Comparative Examples 6 and 10 are shown in FIG. 6C.

The discharge capacity is represented per unit weight of only the porous carbon structure of the cathode.

TABLE 2

| Example | Discharge capacity at 6$^{th}$ cycle [mAh/g] |
| --- | --- |
| Example 5 | 5500 |
| Example 6 | 4400 |
| Comparative Example 6 | 4000 |
| Comparative Example 8 | 3600 |
| Comparative Example 9 | Not available |
| Comparative Example 10 | 3200 |

Figure 6A:
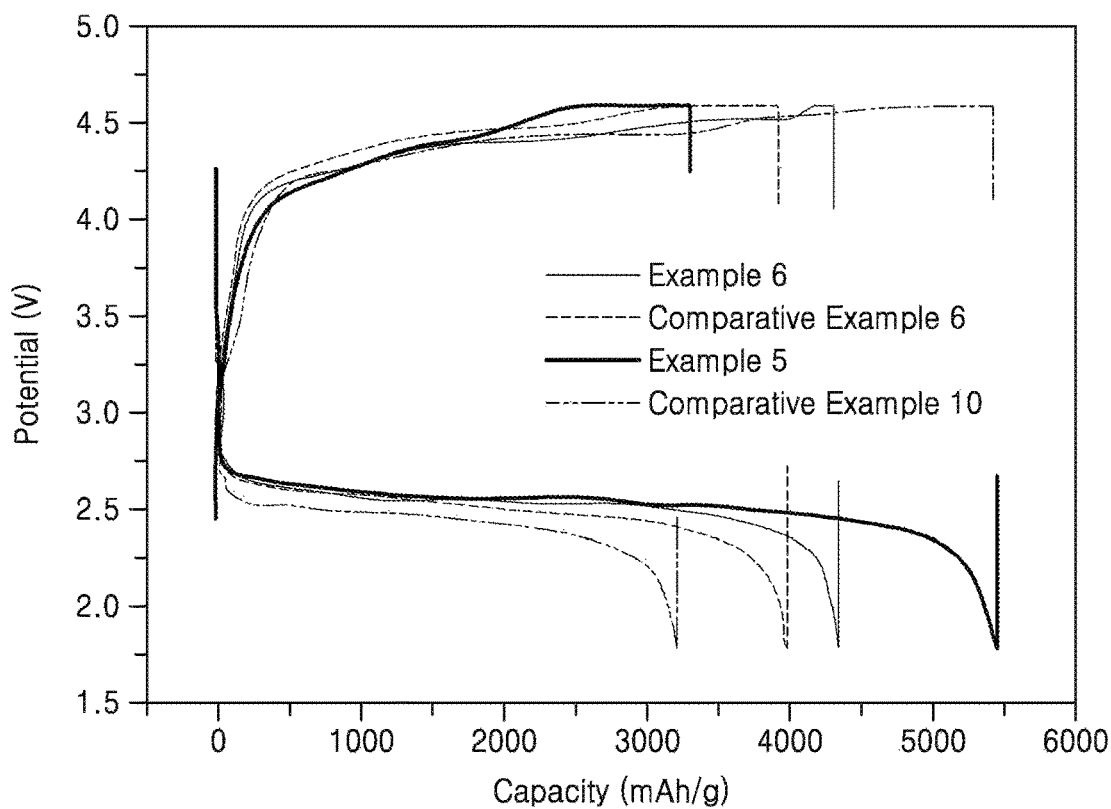
FIG. 6A is a graph of potential (volts, V) versus the capacity (milliampere-hours per gram; mAh/g) which shows charge-discharge curves at the $1^{st}$ cycle of lithium-air batteries of Examples 5 and 6 and Comparative Examples 6 and 10.
Figure 6B:
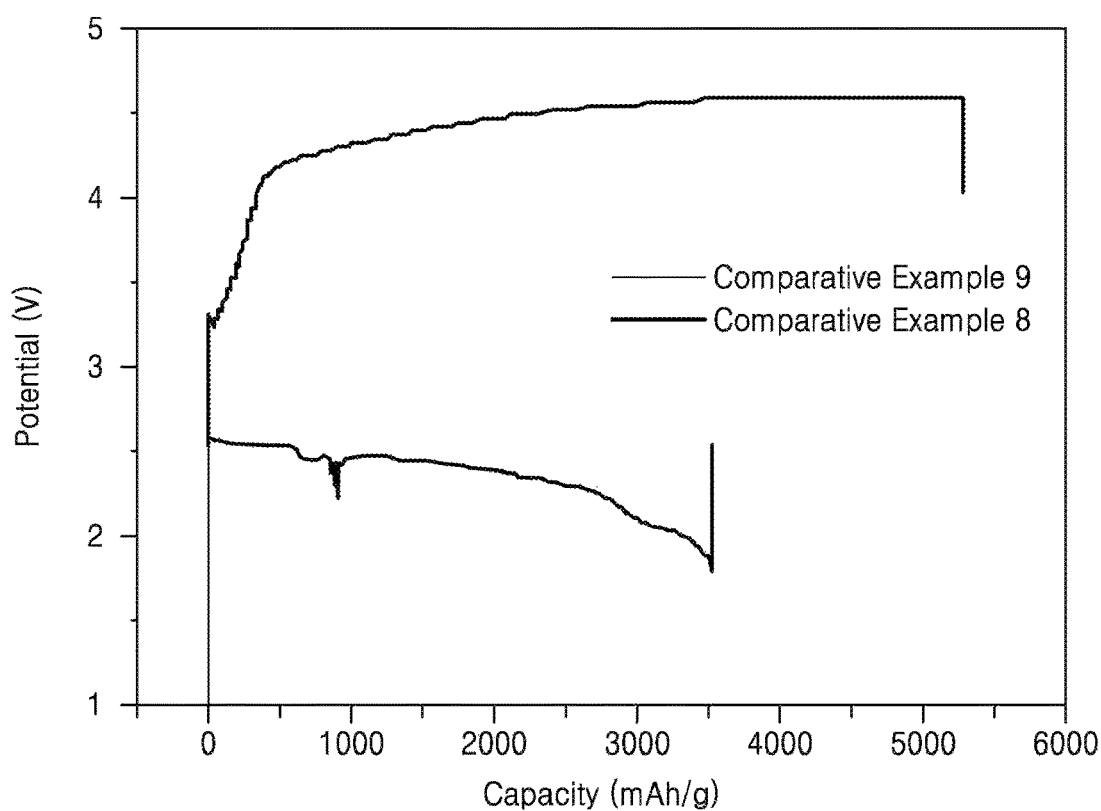
FIG. 6B is a graph of potential (volts, V) versus the capacity (milliampere-hours per gram; mAh/g) which shows charge-discharge curves at the $1^{st}$ cycle of lithium-air batteries of Comparative Examples 8 and 9.
Figure 6C:
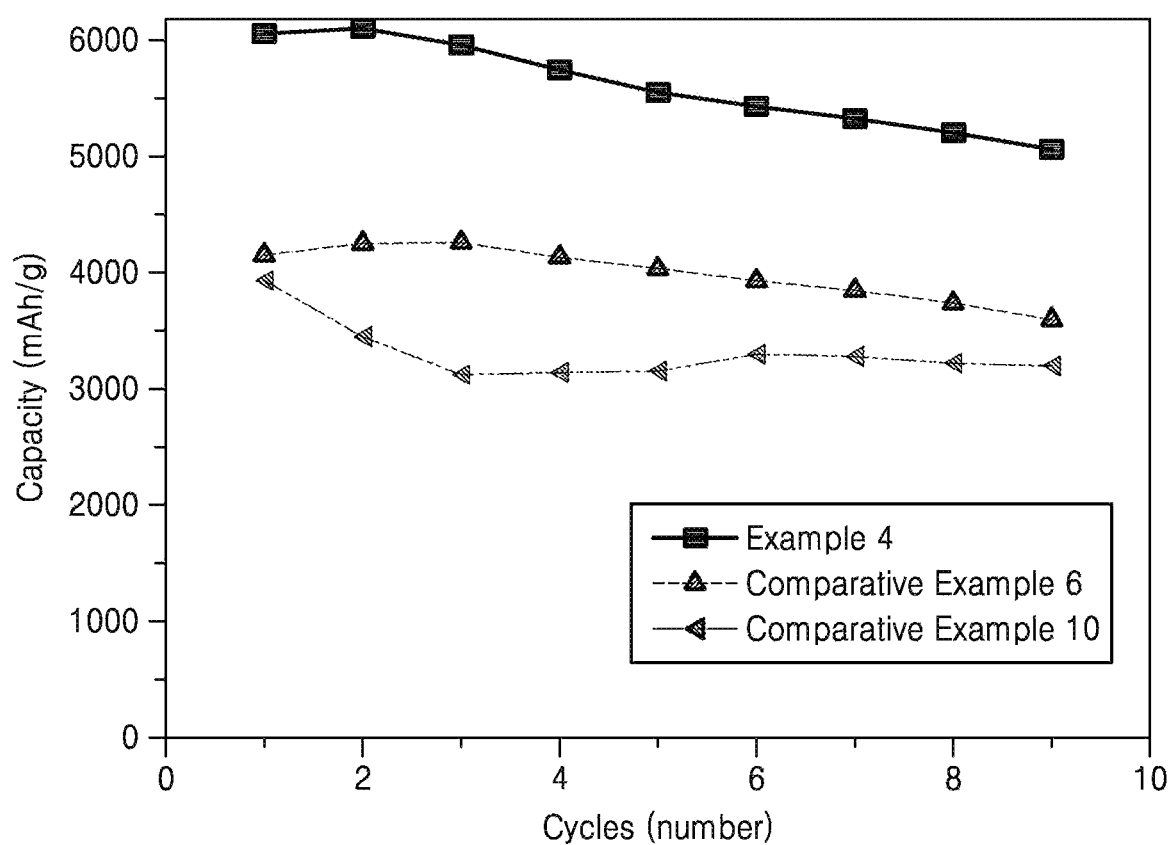
FIG. 6C is a graph of discharge capacity (milliampere-hours per gram, mAh/g) with respect to cycle number for the lithium-air batteries of Example 5 and Comparative Examples 6 and 10.

Referring to Table 2 and FIGS. 6A and 6B, the lithium-air batteries of Examples 5 and 6 were found to have remarkably improved discharge capacity as compared to the lithium-air batteries of Comparative Examples 6, 8, and 10.

Referring to FIG. 6C, the lithium air-battery of Example 5 was found to have remarkably improved discharge capacity up to the 9$^{th}$ cycle, compared to the lithium-air batteries of Comparative Examples 6 and 10.

Such improved discharge capacity in the lithium-air batteries of Examples 5 and 6 are attributed to the presence of both small-diameter pores and large-diameter pores in the porous carbon structure of the lithium-air batteries of Examples 5 and 6. It is believed that the presence of both large and small diameter pores may provide good transfer paths for both oxygen and electrons and a large surface area to effectively accommodate Li$_2$O$_2$ generated during discharging.

Evaluation Example 4: Evaluation of Charge-Discharge Characteristics

The lithium-air batteries of Examples 7 and 8 were discharged at about 60° C. under 1-atm oxygen atmosphere with a constant current of about 0.24 mA/cm$^2$ to a voltage of about 2.0 V (with respect to Li), charged with the same constant current to about 4.5V, and then subjected to charge-discharge cycles with a constant charging voltage to a charging current of about 0.02 mA/cm$^2$. The discharge capacities of the lithium-air batteries at the 1$^{st}$ cycle with about 2.0V are shown in Table 3.

The discharge capacity is represented per unit weight of the porous carbon structure of the cathode.

TABLE 3

| Example | Discharge capacity at 1$^{st}$ cycle [mAh/g] |
| --- | --- |
| Example 7 | 3840 |
| Example 8 | 4990 |

Referring to Table 3, the lithium-air battery of Example 8 including the cathode having a metal (Pb) catalyst-supporting porous carbon structure, was found to have improved discharge capacity as compared to the lithium-air battery of Example 7 including the cathode having a porous carbon structure on which no metal (Pb) catalyst was supported.

Evaluation Example 5: Evaluation of Charge-Discharge Characteristics

The lithium-air batteries of Examples 5 to 8 and Comparative Examples 5 to 8 were discharged at about 60° C. under 1-atm oxygen atmosphere with a constant current of about 0.24 mA/cm$^2$ to reach a discharge capacity of about 1000 mAh/g, charged with the same constant current to about 4.5V, and then charged with a constant charging voltage until a charging current of about 0.02 mA/cm$^2$. The number of cycles at which a capacity retention of about 80% or higher remained in each of the lithium-air battery are shown in Table 1.

The discharge capacity is represented per unit weight of the porous carbon structure of the cathode.

The capacity retention was calculated using Equation 1.

Capacity retention [%]=[Discharge capacity at N$^{th}$ cycle/1000 mAh/g]×100%   Equation 1

TABLE 4

| Example | Cycle number at which a capacity retention of 80% or higher |
| --- | --- |
| Example 5 | 93 |
| Example 6 | 103 |
| Comparative Example 5 | 88 |
| Comparative Example 6 | 91 |
| Comparative Example 7 | Not available |

Referring to Table 4, the lithium-air batteries of Examples 5 and 6 were found to maintain a capacity retention of about 80% or higher at an increased number of cycles, compared to the lithium-air batteries of Comparative Examples 5 and 6.

This improved cycle characteristic, i.e. improved lifetime characteristic, in the lithium-air batteries of Examples 5 and 6 are attributed to the porous carbon structure of the lithium-air batteries. Further, it is believed the lithium-air batteries of Examples 5 and 6 may effectively accommodate stress caused by discharge products generated during charging and discharging and may suppress the formation of clogs in the cathode.

As described above, according to the one or more embodiments, a cathode may include a porous carbon structure including a carbon nanostructure, wherein the porous carbon structure may include large-diameter pores and small-diameter pores. A metal-air battery including the cathode may have improved energy density and improved charge and discharge characteristics.

It should be understood that exemplary embodiments described herein should be considered in a descriptive sense only and not for purposes of limitation. Descriptions of features or aspects within each exemplary embodiment should be considered as available for other similar features or aspects in other exemplary embodiments.

While one or more exemplary embodiments have been described with reference to the figures, it will be understood by those of ordinary skill in the art that various changes in form and details may be made herein without departing from the spirit and scope as defined by the following claims.

What is claimed is:

1. A metal-air battery comprising:
a cathode comprising a porous carbon structure comprising an intertwined network of a plurality of carbon nanostructures,
wherein the porous carbon structure comprises
small-diameter pores having an average diameter of about 25 nanometers to about 200 nanometers, and
large-diameter pores having an average diameter of greater than 200 nanometers to about 1.6 micrometers;
an anode; and
an electrolyte layer disposed between the cathode and the anode,
wherein the carbon nanostructures comprise at least one selected from a one-dimensional carbon nanostructure and a two-dimensional carbon nanostructure.

2. The metal-air battery of claim 1, wherein the one-dimensional carbon nanostructure comprises at least one selected from a carbon nanotube, a carbon nanowire, a carbon nanofiber, a carbon nanobelt, and a carbon nanorod.

3. The metal-air battery of claim 1, wherein the two-dimensional carbon nanostructure comprises at least one selected from graphene oxide, reduced graphene oxide, a graphene nanoplate, and a carbon nanosheet.

4. The metal-air battery of claim 1, wherein the porous carbon structure has a porosity of about 40% to about 70%.

5. The metal-air battery of claim 1, wherein the porous carbon structure has a disordered porous structure.

6. The metal-air battery of claim 1, wherein the porous carbon structure comprises a three-dimensional channel defined by a plurality of interconnected pores.

7. The metal-air battery of claim 1, wherein the porous carbon structure is a free-standing composite film.

8. The metal-air battery of claim 1, wherein the porous carbon structure has a tensile modulus of about 0.001 gigapascals to about 1 gigapascal.

9. The metal-air battery of claim 1, wherein the large-diameter pores and the small-diameter pores each independently have at least one shape selected from a sphere, an oval, a polyhedron, and a rod.

10. The metal-air battery of claim 1, wherein the plurality of the carbon nanostructures are in the form of an aggregation.

11. The metal-air battery of claim 1, wherein the cathode further comprises a metal catalyst supported on the porous carbon structure.

12. The metal-air battery of claim 11, wherein the metal catalyst comprises at least one selected from Pt, Pd, Au, Ag, Ru, Os, Rh, Mn, V, Fe, Ir, Co, Cu, and Ni.

13. A method of preparing a cathode, the method comprising:
contacting a large-diameter pore-forming particle, a small-diameter pore-forming particle, a carbon nanostructure, and a solvent to form a mixture;
filtering the mixture to obtain a filtrate; and
removing the large-diameter pore-forming particle and the small-diameter pore-forming particle from the filtrate to prepare the cathode, the cathode comprising a porous carbon structure comprising an intertwined network of a plurality of carbon nanostructures,
wherein the porous carbon structure comprises
small-diameter pores having an average diameter of about 25 nanometers to about 200 nanometers, and
large-diameter pores having an average diameter of greater than 200 nanometers to about 1.6 micrometers,
wherein the carbon nanostructures comprise at least one selected from a one-dimensional carbon nanostructure and a two-dimensional carbon nanostructure.

14. The method of claim 13, wherein the large-diameter pore-forming particle and the small-diameter pore-forming particle each independently comprise at least one selected from a polymer of a radically polymerizable monomer, a polymer of a multifunctional crosslinking monomer, a microemulsion of polymer bead; a metal oxide comprising at least one selected from $SiO_2$, $TiO_2$, $ZrO_2$, and $Al_2O_3$; and a metal particle comprising at least one selected from copper, nickel, and zinc.

15. The method of claim 13, wherein the solvent is at least one selected from water, alcohol, and aqueous ammonia.

16. The method of claim 13, wherein the removing of the large-diameter pore-forming particle and the small-diameter pore-forming particle comprises a chemical method.

17. The method of claim 13, wherein the mixture further comprises a metal catalyst.

* * * * *